United States Patent [19]

Cartner

[11] Patent Number: 5,197,284
[45] Date of Patent: Mar. 30, 1993

[54] HYDRAULIC MOTOR DECELERATION SYSTEM

[76] Inventor: Jack O. Cartner, 1005 N. 8th St., Cambridge, Ohio 43725

[21] Appl. No.: 742,714

[22] Filed: Aug. 5, 1991

Related U.S. Application Data

[63] Continuation of Ser. No. 453,412, Dec. 19, 1989, abandoned, which is a continuation-in-part of Ser. No. 383,795, Jul. 21, 1989, abandoned.

[51] Int. Cl.[5] .................. F16D 31/02; F16D 39/00
[52] U.S. Cl. ................................. 60/466; 60/468; 60/494; 91/DIG. 2
[58] Field of Search ............... 60/466, 468, 459, 460, 60/494, 450; 91/436, 440, DIG. 2

[56] References Cited

U.S. PATENT DOCUMENTS

| | | | |
|---|---|---|---|
| 3,125,324 | 3/1964 | Vivier | 60/466 X |
| 3,429,123 | 2/1969 | Burroughs | 60/450 |
| 3,490,606 | 1/1970 | Gordon | 212/157 |
| 3,667,227 | 6/1972 | Bentkowsky et al. | 60/489 |
| 3,864,910 | 2/1975 | Mechin | 60/468 X |
| 3,895,490 | 7/1975 | Pachins | 91/436 X |
| 4,067,193 | 1/1978 | Norick | 60/494 X |
| 4,194,365 | 3/1980 | Stoufflet et al. | 60/494 X |
| 4,520,625 | 6/1985 | Sato et al. | 60/468 X |
| 4,586,332 | 5/1986 | Schexnayder | 60/468 |
| 4,628,690 | 12/1986 | Arai et al. | 60/494 X |
| 4,644,849 | 2/1987 | Tanaka | 60/466 X |
| 4,694,649 | 9/1987 | Howeth | 60/494 X |
| 4,713,936 | 12/1987 | Barber et al. | 60/459 X |
| 4,720,975 | 1/1988 | Gunter | 60/466 X |
| 4,732,076 | 3/1988 | Ewald | 60/460 X |
| 4,736,585 | 4/1988 | Kordak | 60/459 X |
| 4,782,662 | 11/1988 | Reeves et al. | 60/494 X |
| 5,046,311 | 9/1991 | Cartner | 60/468 |

FOREIGN PATENT DOCUMENTS 0069676 4/1979 Japan ........................... 60/468

Primary Examiner—Edward K. Look
Assistant Examiner—John Ryznic
Attorney, Agent, or Firm—Fay, Sharpe, Beall, Fagan, Minnich & McKee

[57] ABSTRACT

A hydraulic control system includes a pump, a hydraulic motor and a motor hydraulic circuit interconnecting the pump and the motor. The circuit includes a first hydraulic fluid line extending between the pump and an inlet of the motor and a first control valve located in the fluid line for selectively allowing the flow of fluid between the pump and the motor inlet. A second hydraulic fluid line extends from an outlet of the motor to the first control valve. A circuit is provided for allowing a flow of fluid between the first and second fluid lines. Located in the circuit is a flow control orifice for slowing a flow of fluid between the first and second fluid lines.

12 Claims, 3 Drawing Sheets

HYDRAULIC MOTOR DECELERATION SYSTEM

This is a continuation of copending application Ser. No. 07/453,412 filed on Dec. 19, 1989 now abandoned. This application is a continuation-in-part of application Ser. No. 383,795 filed on July 21, 1989 and now abandoned which is a continuation-in-part of application Ser. No. 383,795 filed on July 21, 1989 and now abandoned.

BACKGROUND OF THE INVENTION

The present invention pertains to hydraulically powered equipment. More particularly, this invention relates to the use of a deceleration circuit for a hydraulic motor.

The invention finds particular application in hydraulic motors which are used to power mowers or ditchers or the like utilized in road maintenance equipment. However, it should be appreciated that the hydraulic motor deceleration system also finds application in other equipment in which a hydraulic motor is employed.

As is well known, hydraulically driven motors are currently utilized to power mowers, ditchers and like equipment especially equipment of the type that is secured to articulated boom assemblies pivotally connected to a tractor and used to maintain the berms of roads and the like. Currently, in such equipment, when hydraulic power is shut off to the motor, the motor, and with it the grass cutting blade or ditching blade which it drives, continues to freewheel (since the control valve of the motor generally has a motoring spool) when communication is interrupted between the hydraulic pump and the motor. If, on the other hand, a non-motoring spool were to be provided, the motor would come to a precipitous stop once the control valve would be actuated to the off position so that communication would be blocked between the hydraulic pump and the motor. Neither one of these alternatives is particularly desirable. When the motor is allowed to freewheel, it does not come to a stop very quickly and the cutting blade may damage something while the boom arm to which the blade housing is secured is being moved. On the other hand, if the motor and the blade would come to a rercipitous stop, great strains would be placed on the motor as well as the fasteners connecting the cutting blade to the motor and the blade would likely break its fasteners and fly off the motor.

Accordingly, it has been considered desirable to develop a new and improved hydraulic motor deceleration system which would overcome the foregoing difficulties and others by providing better and more advantageous overall results.

BRIEF SUMMARY OF THE INVENTION

In accordance with the present invention, a new and improved hydraulic control system is provided.

More particularly in accordance with this aspect of the invention, the system comprises a pump, a hydraulic motor and a motor hydraulic circuit interconnecting the pump and the motor. The circuit comprises a first hydraulic fluid line extending between the pump and an inlet of the motor and a first control valve located in the fluid line for allowing the flow of fluid between the pump and the motor inlet. A second hydraulic fluid line extends from an outlet of the motor to the first control valve. A means is provided for allowing a flow of fluid between the first and second fluid lines and a means is provided for slowing a flow of fluid between the first and second fluid lines.

According to another aspect of the invention, a hydraulic motor deceleration system is provided.

More particularly in accordance with this aspect of the invention, the system comprises a pump, a hydraulic motor and a hydraulic circuit interconnecting the pump and the motor. The circuit comprises a first hydraulic fluid line extending between the pump and the motor and a control valve located in the fluid line for controlling the communication of fluid between the pump and the motor. A second hydraulic fluid line interconnects the control valve and the motor. A third hydraulic fluid line interconnects the first and second fluid lines. Located in the third fluid line is a flow control orifice. The third fluid line allows a flow of hydraulic fluid between the first and second fluid lines even when the control valve is in a closed position. The flow control orifice limits the speed with which such flow takes place.

According to still another aspect of the invention, a hydraulic motor deceleration system is provided.

More particularly in accordance with this aspect of the invention, the system comprises a pump, a hydraulic motor and a hydraulic circuit interconnecting the pump and the motor. The circuit comprises a first hydraulic fluid line extending between the pump and the motor and a control valve located in the fluid line for selectively allowing the flow of fluid from the pump to an inlet of the motor. A second hydraulic fluid line extends between the first control valve and an outlet of the motor. A second control valve is provided which controls the flow of fluid through the second fluid line. The second control valve is at least a two-way valve which includes in one position a means for restricting a flow of hydraulic fluid through the second fluid line.

According to a further aspect of the invention, a method is provided for decelerating a hydraulic motor when the motor is disconnected from a hydraulic pump.

More particularly in accordance with this aspect of the invention, the method comprises the step of providing a hydraulic circuit interconnecting the motor and the pump. The hydraulic circuit including first and second hydraulic fluid lines which communicate, respectively, with an inlet and an outlet of the motor and a valve which controls a flow of hydraulic fluid from the pump to the motor through at least one of the fluid lines. A flow of fluid from the motor to the pump is blocked and a flow of fluid between the first and second fluid lines is allowed thereby enabling the motor to continue turning. The speed of rotation of the motor is slowed by restricting the rate of fluid flow through the fluid lines.

One advantage of the present invention is the provision of a new and improved hydraulic control system.

Another advantage of the present invention is the provision of a hydraulic motor deceleration system which gradually brings a hydraulic motor to a stop after communication is blocked between the hydraulic motor and a hydraulic pump.

Still another advantage of the present invention is the provision of a hydraulic motor deceleration system for a motor control valve which has a non-motoring spool.

Yet another advantage of the present invention is the provision of a hydraulic motor deceleration system for a motor control valve which has a motoring spool.

An additional advantage of the present invention is the provision of a hydraulic motor deceleration system which can be utilized with motor control valves that are either solenoid operated or manually operated.

A further advantage of the present invention is the provision of a method for decelerating a hydraulic motor when the motor is disconnected from a hydraulic pump.

Still further advantages of the present invention will become apparent to others skilled in the art upon a reading and understanding of the following detailed specification.

BRIEF DESCRIPTION OF THE DRAWINGS

The invention may take physical form in certain parts and arrangements of parts preferred and alternate embodiments of which will be described in detail in this specification and illustrated in the accompanying drawings which form a part hereof and wherein.

DETAILED DESCRIPTION OF THE PREFERRED AND ALTERNATE EMBODIMENTS

Figure 1:
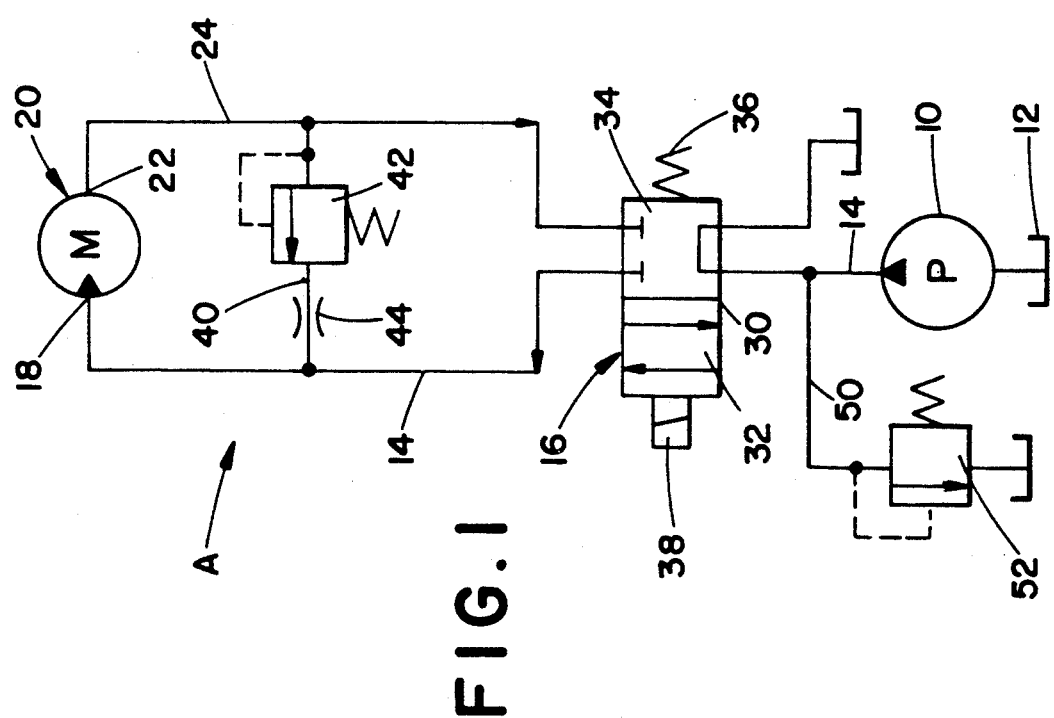
FIG. 1 is a hydraulic circuit diagram of a motor deceleration system hydraulic circuit according to a first preferred embodiment of the present invention.

Referring now to the drawings, wherein the showings are for purposes of illustrating preferred and alternate embodiments of the invention only and not for purposes of limiting same, FIG. 1 is a hydraulic circuit diagram of a first motor deceleration system A according to a first preferred embodiment of the present invention. While the system will be described in connection with a hydraulic motor utilized to power a mower head or a ditcher head fastened on a boom assembly secured to a tractor or other vehicle, it should be appreciated that the motor control circuit disclosed herein could also be adapted for use in many other environments wherein a hydraulic motor is utilized. The mower or ditcher can be fastened to a single arm, an articulated arm, a telescoping arm or a telescoping articulated arm secured to a vehicle.

FIG. 1 discloses a hydraulic motor deceleration system A for use with an electric solenoid operated motor control valve equipped with a non-motoring spool. When the hydraulic system is actuated, a hydraulic pump 10 begins to rotate and hydraulic fluid flows from a hydraulic reservoir 12 into an inlet port of the hydraulic pump. The fluid subsequently flows through a first hydraulic line 14 as allowed by a control valve 16. When the valve allows communication of hydraulic fluid further in the line, the pressurized fluid continues to flow through line 14 to an inlet port 18 of a hydraulic motor 20 which then begins to rotate. Fluid leaving the hydraulic motor 20 flows through an outlet port 22 and through a return line 24 which extends between the motor outlet and the valve 16.

The valve 16 is illustrated to be a two-position, four-way valve that has a valve body 30 and first and second envelopes 32 and 34. The first envelope 32 allows the flow of hydraulic fluid through the line 14 and back through the line 24. The second envelope 34 prevents such flow. As long as the valve 16 is in its neutral or blocked position as is illustrated in FIG. 1, fluid cannot flow through the valve 16 and any fluid delivered by the pump 10 passes through the tandem ports of the valve 16 and returns to a reservoir which preferably is the same as the reservoir 12.

The valve 16 is preferably spring biased by spring 36 to a neutral or blocked position and actuated by a solenoid 38 to an open position. When the solenoid is energized the valve 16 is shifted to the open position and the passageway 14 is opened thereby allowing hydraulic fluid to flow through the valve 16 and the line 14 to the inlet port 18 of the motor 20.

Extending between the first and second hydraulic fluid lines 14 and 24, is a third fluid line 40. Located in the third fluid line is a relief valve 42 as well as a flow control orifice 44. It is noted that the fluid line 40 is located downstream from the valve 16. The orifice 44, which can be either a restricted flow orifice or a variable flow orifice, regulates the rate at which hydraulic fluid flowing through the third hydraulic fluid line 40 can reenter the first fluid line 14 and hence the hydraulic motor 20 when the motor is decelerating as is illustrated in FIG. 1. A variable flow orifice would be useful so that the orifice can be sized for the flow of the motor in question. Also, a variable flow orifice would be desirable if the output of the pump is decreased for some reason. In that circumstance, the orifice size would change.

While the restricted flow orifice 44 is illustrated as being located downstream of the first relief valve 42 in the third fluid line 40, it should be appreciated that the orifice 44 could also be located upstream of the valve 42 and be equally effective.

Located upstream from the valve 16 is a fourth fluid line 50 in which is provided a second relief valve 52 that allows hydraulic fluid to be vented to a reservoir or a sump which preferably is the same sump as sump 12. The relief valve 52 is preset to open at a predetermined pressure to protect the entire system against overpressures. Should the pressure in the system rise above the spring setting of the relief valve 52, the valve would open allowing high pressure hydraulic fluid to bypass the system and return directly to a reservoir.

It should also be noted that the control valve 16, the first and second relief valves 42 and 52 and the restricted flow orifice 44 can be supplied singly or in combination in the same common valve body or block if desired.

Figure 2:
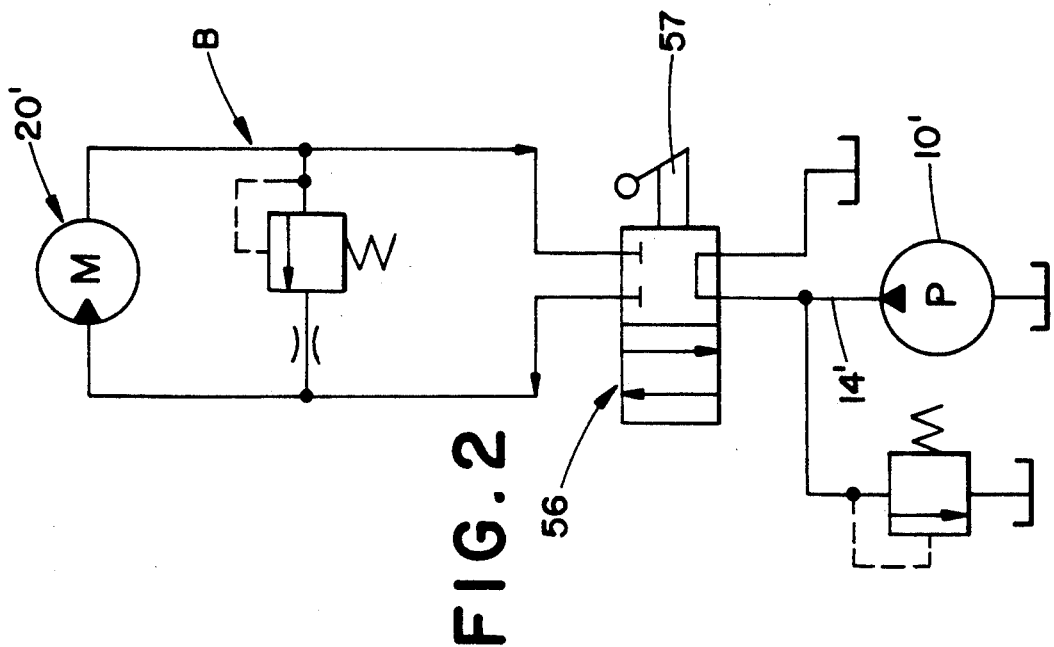
FIG. 2 is a hydraulic circuit diagram of a deceleration system according to a first alternate embodiment of the present invention.

With reference now to FIG. 2, a first alternate embodiment of a hydraulic motor deceleration circuit B according to the present invention is there illustrated. For better appreciation of this alternative, like components will be identified by like numerals with a primed (') suffix and new components will be identified by new numerals.

In this embodiment, a control valve 56 is located in a hydraulic line 14' which connects a hydraulic pump 10' to a hydraulic motor 20'. The valve 56 controls the flow of hydraulic fluid from the pump 10' to the motor 20'. The hydraulic circuit is substantially identical to the circuit illustrated in FIG. 1 except that the valve 56 is a manually actuated valve, controlled by a lever 57, rather than being spring biased to a closed position and solenoid controlled to an open position as is the valve 16 illustrated in FIG. 1.

Figure 1B:
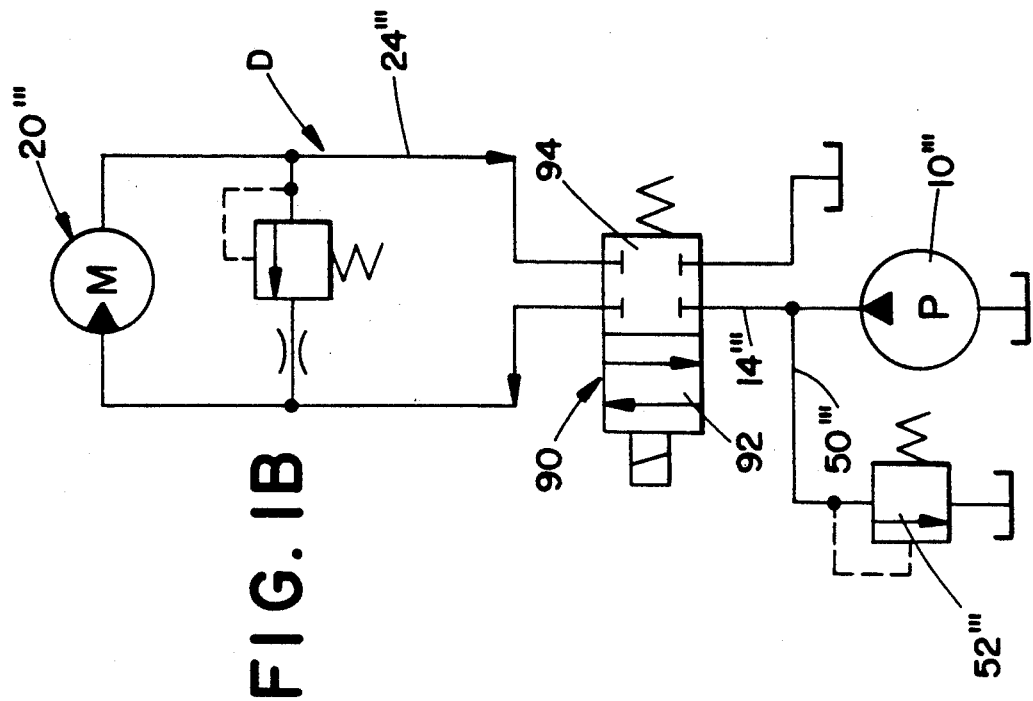
Figure 1A:
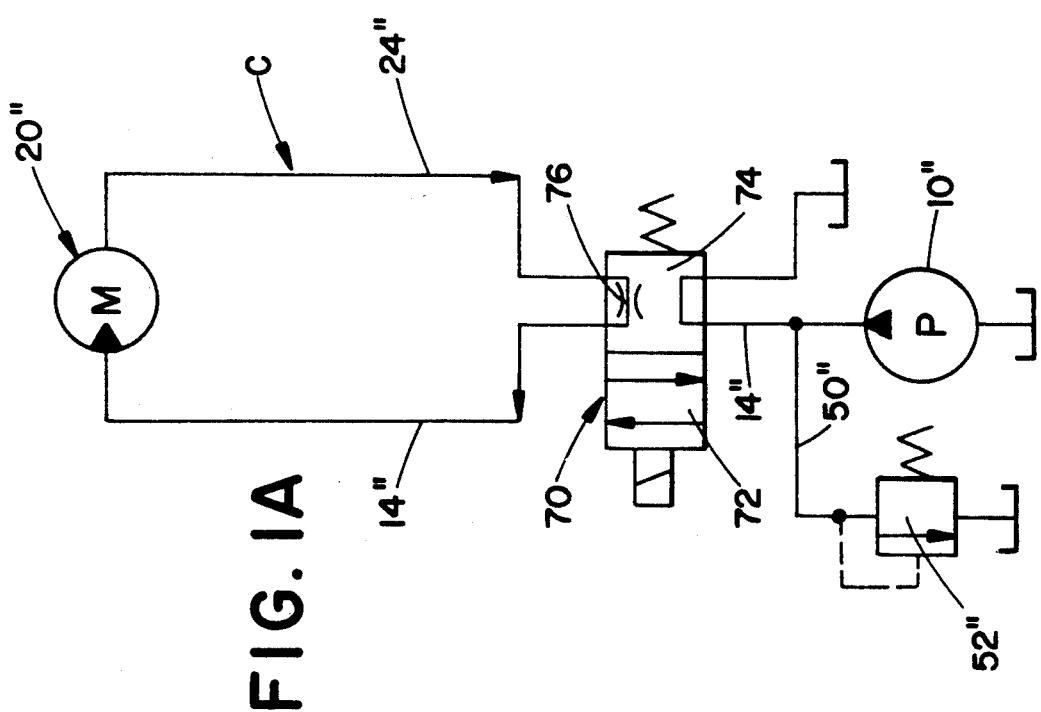

With reference now the FIG. 1A, a second alternate embodiment of a hydraulic motor deceleration circuit C according to the present invention is there illustrated. For better appreciation of this alternative, like components are identified by like numerals with a double primed (") suffix and new components will be identified by new numerals.

In this embodiment, a control valve 70 is located in a hydraulic line 14" leading from a pump 10" to a motor 20". A second hydraulic line 24" leads back to the valve 70. In this embodiment, the valve 70 includes a first envelope 72 which allows the flow of hydraulic fluid through the line 14" and back through the line 24". The second envelope 74 of the valve 70 prevents flow back through the line 24" to a sump and instead channels the fluid flow back into line 14" after passing through a restricted flow orifice 76 located in the second envelope 74. In other words, the restricted flow orifice 76 regulates the amount of flow from the second fluid line 24" back to the first fluid line 14". In this way, the restricted flow orifice 76 serves as a means for decelerating the motor 20". In this embodiment, there is no need for a third fluid line 40, relief valve 42 and restricted flow orifice 44 as are illustrated in the embodiment of FIG. 1.

While a restricted flow orifice 76 is illustrated in the second envelope 74 of the valve 70, it should be appreciated that a variable flow orifice could also be utilized in order to size the orifice to the flow of the motor in question. Also a variable flow orifice would be desirable if the output of the pump is decreased for some reason, in order to enable the orifice size to change.

A fourth hydraulic fluid line 50" can be provided in communication with the first line 14" in order to allow excess hydraulic fluid to be vented to a reservoir through a relief valve 52".

With reference now to FIG. 1B, a third alternate embodiment of the hydraulic motor deceleration circuit D according to the present invention there illustrated. For better appreciation of this alternative, like components will be identified by like numerals with a triple primed ('") suffix and new components will be identified by new numerals.

In this embodiment, a control valve 90 is located in a hydraulic line 14'" which connects a hydraulic pump 10'" to a hydraulic motor 20'". The valve 90 controls the flow of hydraulic fluid through the first line 14'" as well as through a second line 24'". This valve includes a first envelope 92 which is identical to the first envelope 32 of the valve 16 illustrated in FIG. 1. The valve also includes a second envelope 94 which prevents all communication between the pair of parallel lines leading to and away from the valve. Therefore, unlike the embodiment of FIG. 1, the pump 10'" is unable to communicate with the sump through the valve chamber 94. Instead, flow from the pump 10'" to sump is accomplished through a fourth fluid line 50'" as regulated by a pressure relief valve 52'".

Figure 3:
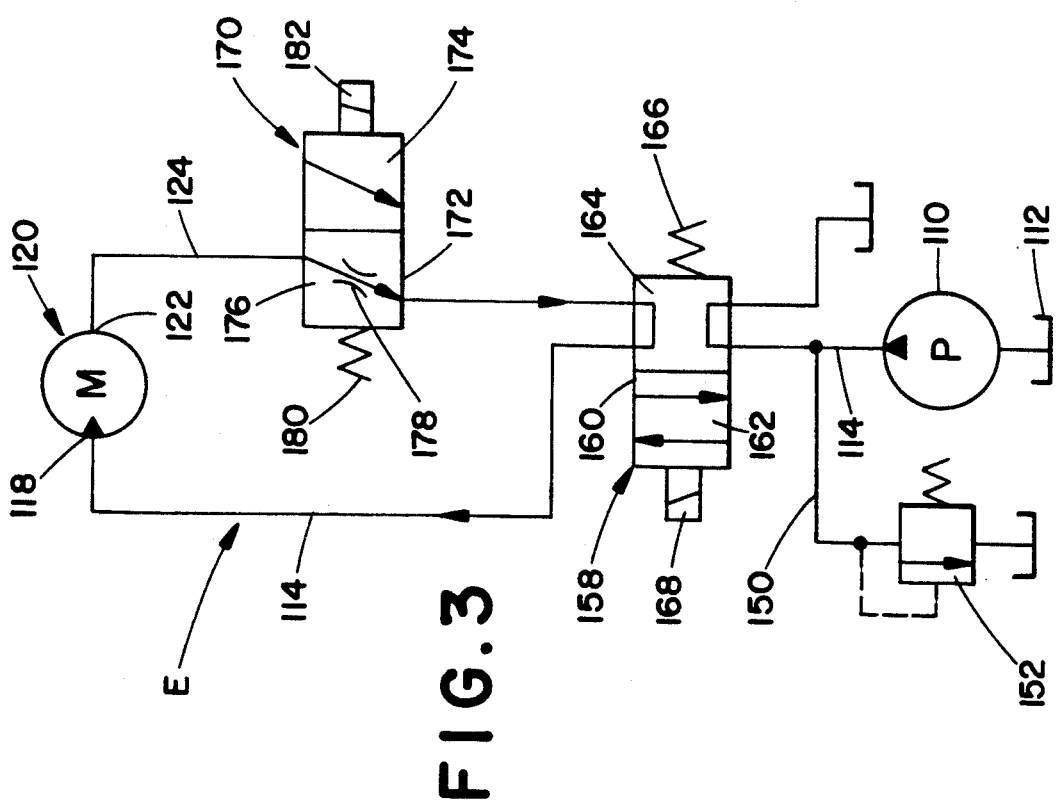
FIG. 3 is a hydraulic circuit diagram of a motor deceleration system according to a second preferred embodiment of the present invention; and, FIG. 4 is a hydraulic circuit diagram of a second alternate embodiment of a motor deceleration system according to the present invention.

With reference now to FIG. 3, a second preferred embodiment of a hydraulic motor deceleration circuit E is there illustrated.

In this embodiment, a hydraulic pump 110 is used to pump hydraulic fluid from a sump or reservoir 112 through a first fluid line 114 to an inlet 118 of a hydraulic motor 120. Hydraulic fluid exits the motor 120 through an exit port 122 and flows through a second fluid line 124. In this embodiment, a motor control valve 158 includes a valve body 160 having a first envelope 162 that allows the flow of hydraulic fluid through the valve and a second envelope 164 which blocks such flow. As illustrated in FIG. 3, when the envelope 164 blocks flow, hydraulic fluid delivered by the pump passes through the valve and is returned directly to a reservoir which may be the same as reservoir 112. Also, the envelope 164 allows fluid to flow between the inlet and outlet lines 114 and 124. This is called a motoring spool since it allows the motor 120 to continue to turn even when blocked from communication with the pump 110.

The valve 158 is biased by a spring 166 to a closed position, i.e., to envelope 164 and is actuated to an open position by a solenoid 168. In the valve position illustrated in FIG. 3, the valve 158 is closed by the spring 166. When the solenoid 168 is energized, the valve 158 is shifted to the first envelope 162 thereby opening a passageway through the valve and allowing hydraulic fluid to flow to the inlet port 118 of the motor 120.

Located in the fluid return line 124 is a control valve 170 which comprises a valve body 172 having a first envelope 174 that allows unrestricted fluid flow and a second envelope 176 which includes a restricted flow orifice 178 which modulates the amount of fluid flow. The valve 170 is biased by a spring 180 to the restricted fluid flow envelope 176 and is actuated by a solenoid 182 to the unrestricted flow envelope 174.

Preferably, the solenoid 168 of the valve 158 and the solenoid 182 of the control valve 170 are wired together so that they are energized simultaneously. In other words, as the solenoid 168 shifts the valve 158 to the open position, i.e., to the first envelope 162 as illustrated in FIG. 3, the solenoid 182 shifts the valve 170 to the free flow position, i.e., to the first envelope 174.

When the valves 158 and 170 are in the positions illustrated in FIG. 3, the restricted flow orifice 178 in the valve 170 regulates the rate at which hydraulic fluid returning from the motor 120 flows back through valve envelope 164 and line 114 into the motor 120 in an endless loop thereby decelerating the motor and eventually stopping it.

As in the embodiment of FIG. 1, a relief valve 152 can be connected to the first fluid line 114 through a line 150 to protect the entire hydraulic system. In other words, should system pressure rise above the pressure setting on the relief valve 152, which valve is normally closed, the valve would open to allow high pressure hydraulic fluid to bypass the system and flow from line 114 to line 150 and return directly to a sump or reservoir which is preferably the reservoir 112.

The several valves 158, 170 and 152 can be housed in the same valve block or body if desired.

Figure 4:
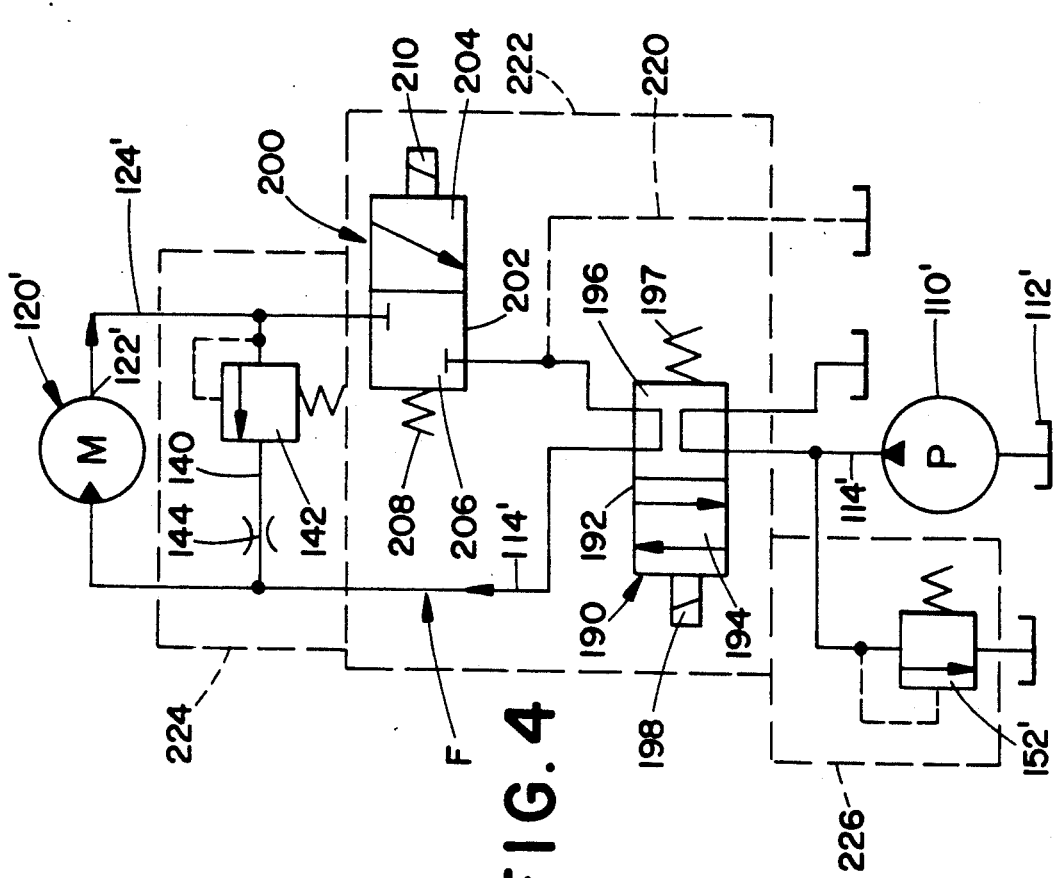

With reference now to FIG. 4, a fourth alternate embodiment of a hydraulic motor deceleration circuit F according to the present invention is there illustrated. For ease of understanding of this alternative, like components will be identified by like numerals with a primed (') suffix and new components will be identified by new numerals.

In this embodiment, when the hydraulic system is turned on, a hydraulic pump 110' will withdraw fluid from a reservoir 112' and send it through a first fluid line 114' to a motor 120' as regulated by a valve 190. The valve comprises a valve body 192 having a first, flow permitting, envelope 194 and a second flow blocking envelope 196. The valve 190 is preferably biased by a spring 197 to the second flow blocking envelope 194 and actuated by a solenoid 198 to the first flow permitting envelope 196.

As in the embodiment of FIG. 3, the second valve envelope 196 allows the communication of the first fluid line 114' with a second fluid line 124' which extends from an outlet port 122' of the motor to the valve 190. Located in line 124' is a control valve 200 which comprises a valve body 202 having a first envelope 204 which allows free flow of hydraulic fluid through the line 124' and a second envelope 206 which blocks such flow. The valve 200 is preferably spring-biased to the closed position by a spring 208 and solenoid operated by a solenoid 210 to the open position.

Preferably, the solenoid 98 of the valve 190 is wired together with the solenoid 210 of the valve 200. In other words, as illustrated in FIG. 4, when the right envelope 196 of the valve 190 blocks fluid flow through the valve, the left envelope 206 blocks fluid flow through the control valve 200. Hydraulic fluid flowing through line 124' will then flow through a third fluid line 140 communicating the first and second fluid lines 114' and 124'. The third fluid line 140 is located downstream from the valve 190 and interposed between the motor 120' and the valve 200. Positioned in the third fluid line is a relief valve 142 as well as a restricted flow orifice 144 which controls the rate of flow through the line 140.

Hydraulic fluid is thus able to circulate between lines 114' and 124' and through the motor 120' by way of the third fluid line 140 even when the valve 200 is in the closed position. However, the motor is gradually slowed down because the hydraulic fluid needs to pass through the restricted flow orifice 144. As in the earlier embodiments, the flow control orifice can be either a restricted flow orifice or a variable flow orifice as is desired.

If desired, an additional fourth fluid line 220 can be in communication with the second fluid line 124'. This allows fluid to flow through the motor 120' and bypass the valve 190 by flowing directly back to sump. That can be advantageous when the motor is running for long periods of time since the motor will run cooler if the hydraulic fluid is not heated by friction as it passes through the valve 190 on its way back to sump.

The various dashed boxes 222, 224, 226 indicate that one or more of the valves 190, 200, 142 and 152' can be located in one or more valve bodies.

The invention has been described with reference to preferred and alternate embodiments. Obviously, modifications and alterations will occur to others upon the reading and understanding of the preceding specification. It is intended that the invention be construed as including all such alterations and modifications insofar as they come within the scope of the appended claims or the equivalents thereof.

Having thus described the preferred and alternate embodiments, the invention is now claimed to be:

1. A hydraulic control system comprising:
a pump;
a hydraulic motor; and
a motor hydraulic circuit interconnecting said pump and said motor, said circuit comprising:
a first hydraulic fluid line extending between said pump and an inlet of said motor,
a first control valve located in said fluid line for selectively allowing the flow of fluid between said pump and said motor inlet, said first control valve comprising a first envelope which allows a flow of fluid from said pump to said motor and a second envelope which prevents a flow of fluid from said pump to said motor,
a second hydraulic fluid line extending from an outlet of said motor to said first control valve,
a means for allowing a circulation of fluid through said motor and between said first and second fluid lines when said pump is disconnected from said motor, wherein said means for allowing circulation comprises a fluid path in said second envelope of said first control valve which fluid path allows a flow of fluid therethrough without fluid loss, and
a means for slowing a flow of fluid between said first and second fluid lines, wherein said means for slowing comprises a flow control orifice located in said fluid path in said second envelope of said first control valve.

2. The system of claim 1 wherein said first control valve comprises a two position four way solenoid actuated spring biased valve.

3. The system of claim 1 wherein said first control valve comprises a two position four way manually actuated spring biased valve.

4. A method for decelerating a hydraulic motor when the motor is disconnected from a hydraulic pump, said method comprising:
providing a hydraulic circuit interconnecting the motor and the pump, said hydraulic circuit including first and second hydraulic fluid lines which communicate, respectively, with an inlet and an outlet of said motor and a first valve which controls a flow of hydraulic fluid from said pump to said motor through at least one of said firt and second fluid lines;
blocking a flow of fluid from said motor to said pump;
allowing a flow of fluid between said first and second fluid lines without fluid loss thereby enabling said motor to continue turning; and,
slowing the speed of rotation of said motor by restricting the rate of flow of fluid through said first and second fluid lines wherein said step of slowing the speed comprises the subsidiary step of providing a flow control orifice in one envelope of said first valve, said one envelope communicating said first and second hydraulic fluid lines, while preventing a flow of fluid out of said first and second fluid lines and also preventing a flow of fluid from said pump to said motor.

5. A hydraulic motor deceleration system comprising:
a pump;
a hydraulic motor;
a hydraulic circuit interconnecting said pump and said motor, said circuit comprising:
a first hydraulic fluid line extending between said pump and said motor,
a first control valve located in said first fluid line for controlling the communication of fluid between said pump and said motor,
a second hydraulic fluid line interconnecting said control valve and said motor,
a third hydraulic fluid line interconnecting said first and second hydraulic lines,
a relief valve located in said third fluid line, and
a flow control orifice located in said third fluid line, said flow control orifice being constantly operative, said third fluid line allowing a flow of hydraulic fluid from said second fluid line to said first fluid line even when said control valve is in a closed position, as regulated by said relief valve, and wherein said flow control orifice limits the speed with which such flow takes place.

6. The system of claim 5 wherein said flow control orifice comprises a restricted flow orifice.

7. The system of claim 5 wherein said flow control orifice comprises a variable flow orifice.

8. The system of claim 5 wherein said first control valve comprises a two position solenoid actuated spring-biased valve.

9. The system of claim 5 further comprising a second control valve located in said second fluid line wherein said first control valve comprises a two envelope four way valve having one envelope which allows a flow of fluid between said first and second fluid lines.

10. The system of claim 9 wherein said second flow control valve comprises a two position two way valve having one envelope which prevents a flow of fluid therethrough.

11. The system of claim 9 wherein said second control valve is located in said second fluid line downstream from said third fluid line.

12. A method for decelerating a hydraulic motor when the motor is disconnected from a hydraulic pump, said method comprising:
providing a hydraulic circuit interconnecting the motor and the pump, said hydraulic circuit including first and second hydraulic fluid lines which communicate, respectively, with an inlet and an outlet of said motor and a first valve which controls a flow of hydraulic fluid from said pump to said motor through at least one of said first and second fluid lines;
blocking a flow of fluid from said motor to said pump;
allowing a flow of fluid between said first and second fluid lines without a loss of fluid thereby enabling said motor to continue turning; and
allowing the speed of rotation of said motor by restricting the rate of flow of fluid through said first and second fluid lines wherein said step of slowing comprises the subsidiary steps of:
providing a third hydraulic fluid line which selectively communicates said first and second fluid lines as regulated by a relief valve; and
providing a flow control orifice in said third fluid line, said flow control orifice being constantly operative to throttle fluid flow through said third fluid line.

* * * * *

UNITED STATES PATENT AND TRADEMARK OFFICE
CERTIFICATE OF CORRECTION

PATENT NO. : 5,197,284 Page 1 of 1
APPLICATION NO. : 07/742714
DATED : March 30, 1993
INVENTOR(S) : Jack O. Cartner It is certified that error appears in the above-identified patent and that said Letters Patent is hereby corrected as shown below:

In claim 12, line 16, delete "allowing" and insert --slowing--.

Signed and Sealed this

Seventeenth Day of July, 2007

JON W. DUDAS
*Director of the United States Patent and Trademark Office*